No. 723,449. PATENTED MAR. 24, 1903.
T. A. EDISON.
ELECTRODE FOR STORAGE BATTERIES.
APPLICATION FILED NOV. 28, 1902.
NO MODEL. 3 SHEETS—SHEET 1.

Witnesses:
Jas. F. Coleman
Jno. Robt Taylor

Inventor
Thomas A. Edison
by Dyer Edmonds & Dyer
Attorneys

No. 723,449. PATENTED MAR. 24, 1903.
T. A. EDISON.
ELECTRODE FOR STORAGE BATTERIES.
APPLICATION FILED NOV. 28, 1902.
NO MODEL. 3 SHEETS—SHEET 2.

Witnesses: Jas. F. Coleman, Jno. Robt Taylor

Inventor: Thomas A. Edison by Ayer Edmond Dyer Attorneys

No. 723,449. PATENTED MAR. 24, 1903.
T. A. EDISON.
ELECTRODE FOR STORAGE BATTERIES.
APPLICATION FILED NOV. 28, 1902.
NO MODEL. 3 SHEETS—SHEET 3.
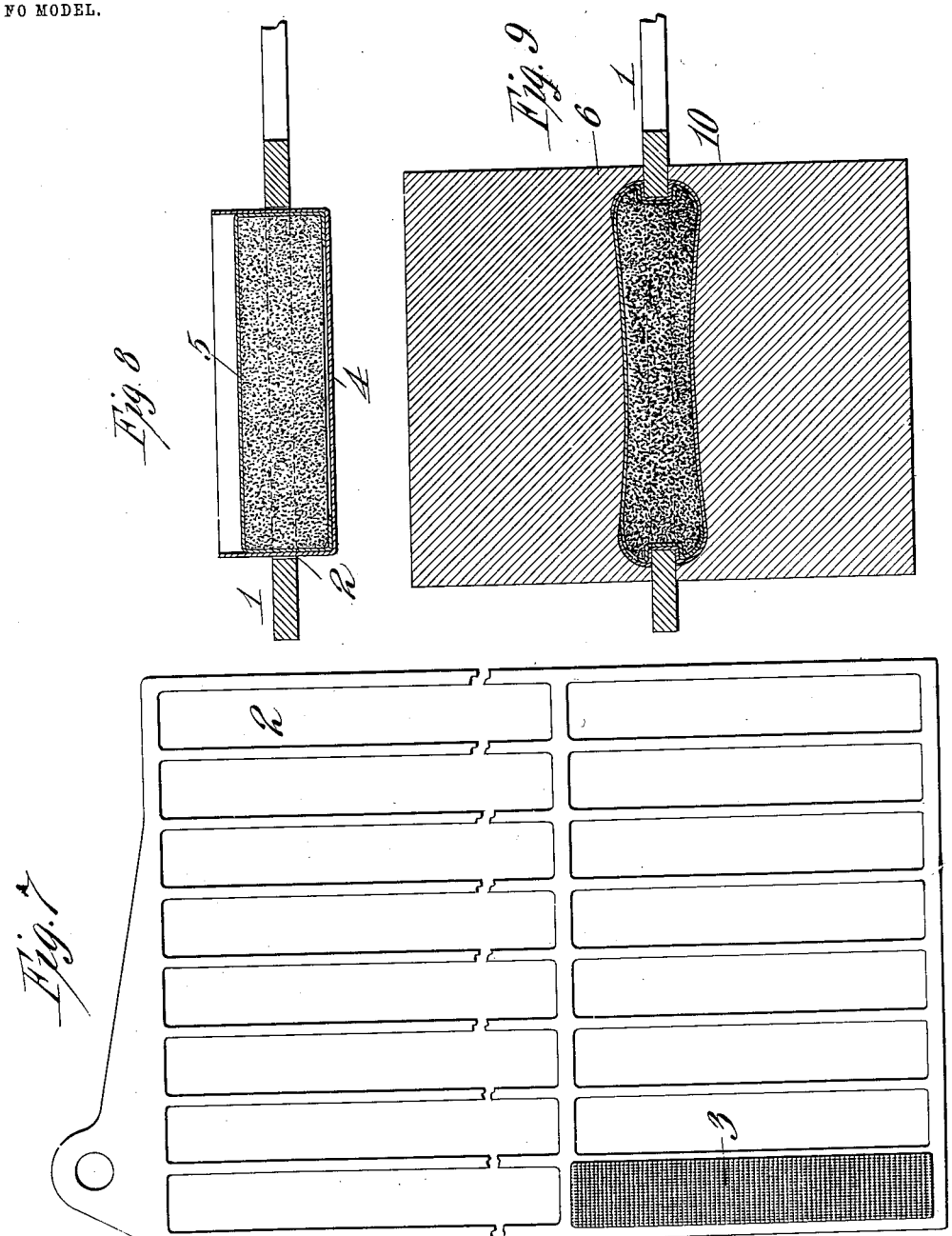
Witnesses: Inventor
Attorneys

UNITED STATES PATENT OFFICE.

THOMAS A. EDISON, OF LLEWELLYN PARK, NEW JERSEY.

ELECTRODE FOR STORAGE BATTERIES.

SPECIFICATION forming part of Letters Patent No. 723,449, dated March 24, 1903.

Application filed November 28, 1902. Serial No. 133,115. (No model.)

*To all whom it may concern:*

Be it known that I, THOMAS A. EDISON, a citizen of the United States, residing at Llewellyn Park, Orange, in the county of Essex and State of New Jersey, have invented a certain new and useful Improvement in Electrodes for Storage Batteries, of which the following is a specification.

My invention relates to storage batteries of the type invented by me, and wherein an alkaline electrolyte is employed with insoluble active materials. The preferable material used for depolarizing purposes is an electrolytically-active oxid of nickel, and that for the oxidizable element on discharge is electrolytically-active iron or compound thereof. These active materials are supported in position within sheet-metal nickel-plated perforated corrugated pockets or receptacles crimped in position within openings formed in suitable plates or grids. I have found in practice, and especially so in connection with the nickel element, that the active material when immersed in the electrolyte and subjected to a charging-current tends to objectionably bulge at the center, so that the plates cannot be placed sufficiently close to each other, as is desirable where weight of electrolyte is sought to be reduced. I have found that by concaving the pockets or receptacles when the electrode is first assembled the swelling of the active material does not objectionably bulge the latter, whereby I am enabled to overcome the objection noted, and it is to this feature that the invention principally relates. I have also found that the best results are secured in practice when the manufacture follows a definite line of procedure, and this process constitutes the second part of my invention.

In order that my invention may be better understood, attention is directed to the accompanying drawings, forming part of this specification, and in which—

Figure 1:
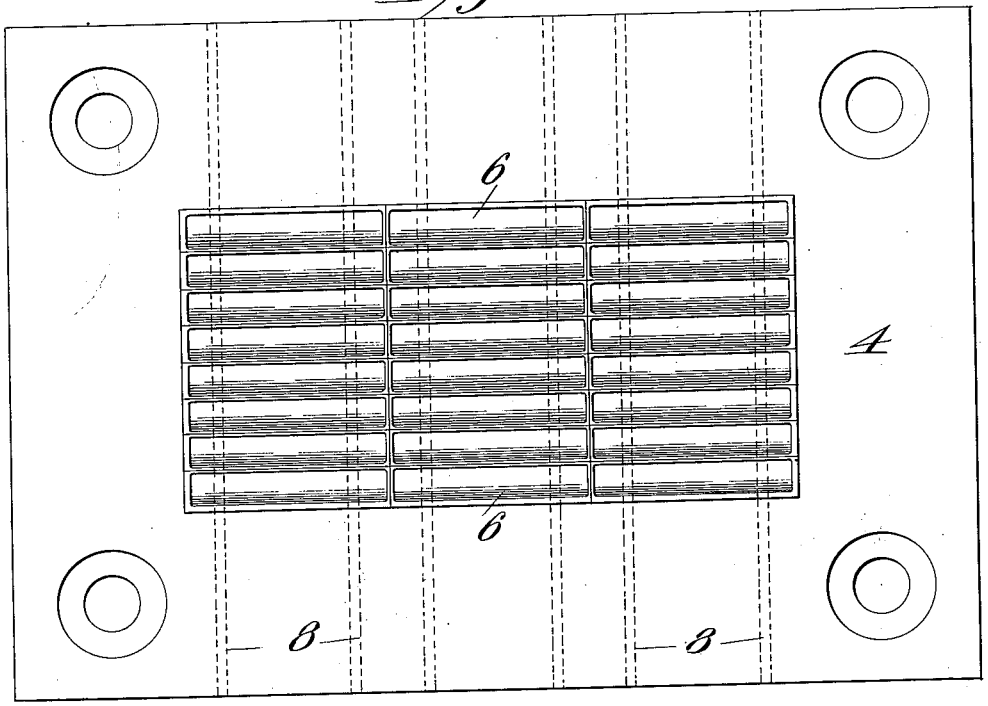
Figure 2:
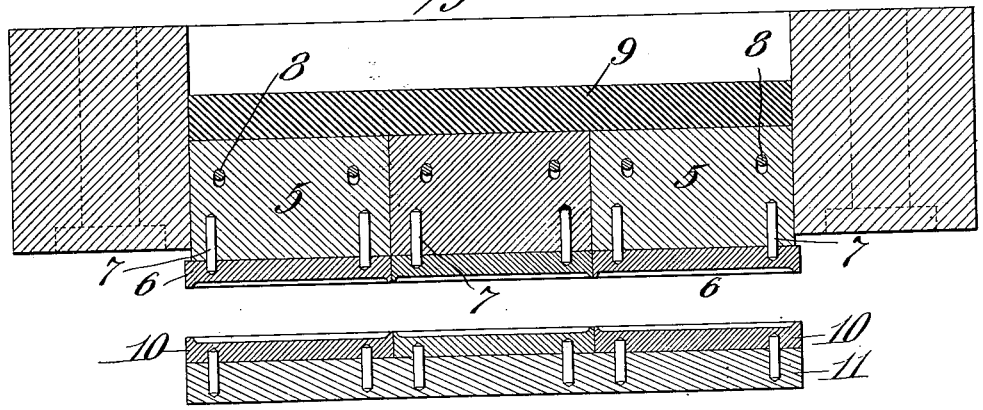
Figure 3:
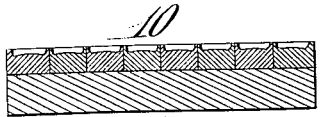
Figure 4:
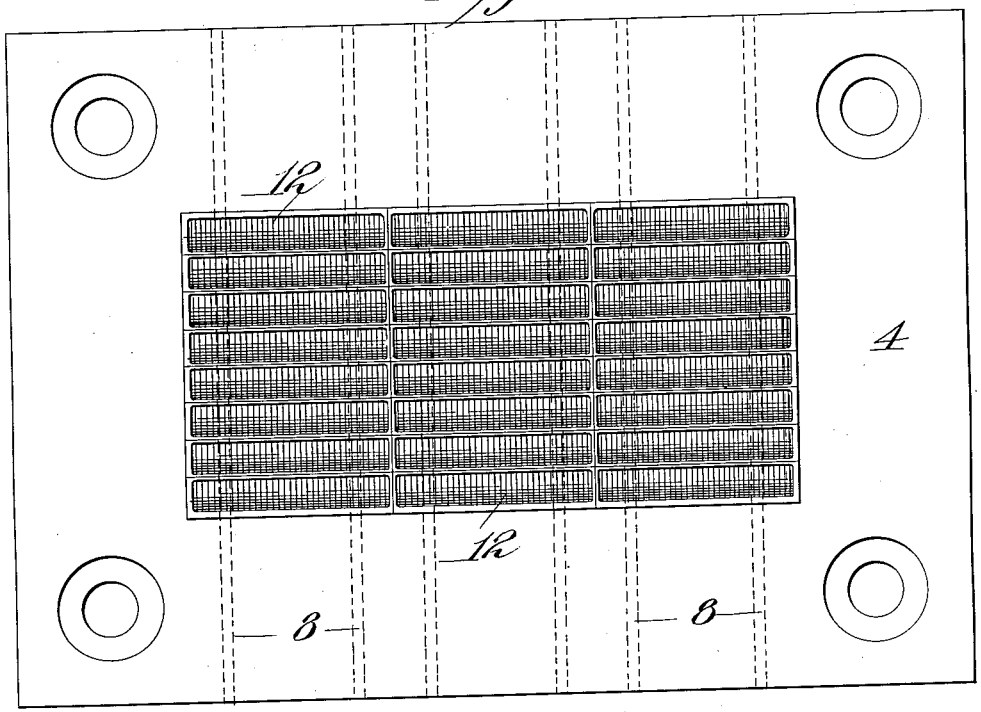
Figure 5:
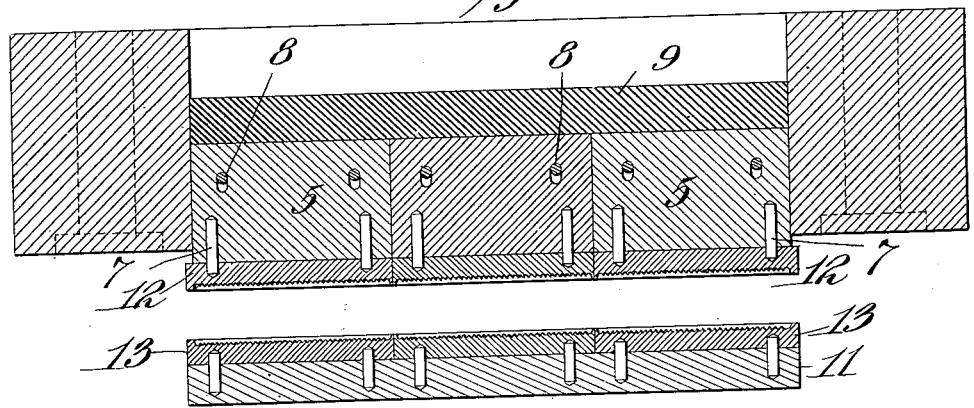
Figure 6:

Figure 1 is a plan view of a set of independently-mounted smooth concaving-dies; Fig. 2, a sectional view through the same and illustrating also the opposing set of solidly-mounted concaving-dies; Fig. 3, a cross-sectional view through the latter dies; Figs. 4, 5, and 6 views corresponding to Figs. 1, 2, and 3, illustrating the corrugating-dies; Fig. 7, a plan view of one of the grids, showing a single pocket or receptacle in position therein; Fig. 8, a cross-sectional view, on an enlarged scale, showing the two parts of one of the pockets introduced in position within one of the openings in the grid; and Fig. 9, a corresponding view on the same scale, showing the smooth dies for effecting a crimping of the pockets and for also concaving the same.

In all the above views corresponding parts are represented by the same numerals of reference.

1 represents the grid or plate, made of iron or steel, carefully nickel-plated and formed with openings 2 therein, and 3 represents one of the sheet-metal nickel-plated corrugated pockets or receptacles crimped into position in one of the openings. Each of these pockets or receptacles is composed of two cup-shaped parts 4 and 5, the former receiving the latter. The briquet is first introduced into the part 5 and the edges are turned down underneath the briquet, so as to firmly lock the briquet in the part 5. (See Fig. 8.) The part 5, carrying the briquet, is then introduced into the part 4, so that when a crimping pressure is applied to both parts the part 5 will be locked within the part 4, and the pocket or receptacle as a whole will be crimped around the edges of the opening in which it is introduced, so as to be firmly locked in place therein. By turning the edges of the part 5 around the briquet, as explained, the briquet will be held more rigidly in position than when it is merely introduced into the part 5, as I have described in previous patents. As shown in Fig. 9, the pockets or receptacles are concaved longitudinally, so that when any swelling of the active material takes place it will not objectionably bulge the pockets. This inward concaving or arching of the pockets also strengthens them somewhat to resist bulging strains, as will be obvious. The concaving and crimping of the pockets in place are effected by means of dies, which apply pressure to all the pockets of a single plate, so that a complete electrode will be formed by a single compressing operation. I find, however, in practice that the best results are secured in the manufacture of corrugated pockets when two sets of dies are employed, one for effecting the crimping and concaving of the pockets and the other for effecting the corrugating thereof, since in this way the application of the first pressure tends to evenly distribute the active material within the pockets. If, on the contrary, the concaving, crimping, and corrugating of the pockets were effected at a single operation, I have found that the active material is not satisfactorily distributed throughout the several pockets. I preferably therefore employ two sets of dies, one set being shown in Figs. 1, 2, and 3, and the other set being shown in Figs. 4, 5, and 6. Referring to the first set, 4 represents a heavy frame carried by the movable member of a hydraulic or other powerful press. Mounted in this frame are a number of blocks 5, each carrying a die 6, secured to the blocks by means of pins 7. The blocks 5 are capable of independent movement with respect to each other and with respect to the frame 2 by being strung on pins 8, engaging slotted openings in said blocks. Behind the blocks is a layer of rubber 9 or other suitable yielding but non-compressible material, whereby any one of the dies 6 is capable of moving independently of the other dies. Coöperating with the dies 6 are corresponding dies 10, carried by a plate 11, secured to the stationary member of the press. As shown in Fig. 3, the dies 6 and 10 are provided with smooth convex surfaces. It will be obvious that by assembling the two parts, 4 and 5, of each receptacle in the several pockets of the plate and by first introducing a briquet of the active material in said pockets the application of pressure to the frame 4 will cause the dies 6 and 10 to force the parts 4 and 5 of each pocket together to lock the part 5 within the part 4 to crimp the pocket or receptacle as a whole around the edges of the corresponding opening and to concave the longitudinal faces of each pocket. This application of smooth concaving-dies effects an even distribution of the active material throughout each of the pockets.

The dies shown in Figs. 4, 5, and 6 are identical with those previously described, except that the dies 12 and 13 (corresponding to the dies 6 and 10, respectively,) are provided with transverse corrugations, as shown in Fig. 6. When the pockets or receptacles have been concaved and crimped in position within the grid or plate, the latter is placed between the dies 12 and 13 and pressure applied, whereby the pockets or receptacles will be transversely corrugated, as I have described in patents already granted. By thus transversely corrugating the exposed surfaces of the pockets or receptacles the strength of the latter is very materially increased, permitting the employment of lighter sheet metal.

The purpose of mounting the dies 6 and 12 so that they shall be capable of independent movement is to accommodate variations in the amount of active material in the several pockets and inevitable in a manufacturing operation carried out on a large scale.

Having now described my invention, what I claim as new, and desire to secure by Letters Patent, is as follows:

1. A battery-electrode, comprising a plate having an opening therein, a pocket or receptacle secured in said opening and having a concaved surface, and an active material in said pocket or receptacle, substantially as set forth.

2. A battery-electrode, comprising a plate having an opening therein, a pocket or receptacle secured in said opening and having concaved surfaces, and an active material in said pocket or receptacle, substantially as set forth.

3. A battery-electrode, comprising a plate having an opening therein, a pocket or receptacle secured in said opening and having a concaved corrugated surface, and an active material in said pocket or receptacle, substantially as set forth.

4. A battery-electrode, comprising a plate having an opening therein, a pocket or receptacle secured in said opening and having concaved corrugated surfaces, and an active material in said pocket or receptacle, substantially as set forth.

5. A battery-electrode, comprising a plate having an opening therein, a pocket or receptacle having a concaved surface and crimped in position within said opening, and an active material in said pocket or receptacle, substantially as set forth.

6. A battery-electrode, comprising a plate having an opening therein, a pocket or receptacle made of two parts, crimped in position within the opening and having a concaved surface, and an active material in said pocket or receptacle, substantially as set forth.

7. A battery-electrode, comprising a plate having a plurality of openings therein, a pocket or receptacle in each opening having a concaved surface, and an active material in said pocket or receptacle, substantially as set forth.

8. A battery-electrode, comprising a plate having a plurality of openings therein, a pocket or receptacle in each opening having concaved surfaces, and an active material in said pocket or receptacle, substantially as set forth.

9. A battery-electrode, comprising a plate having a plurality of openings therein, a pocket or receptacle crimped in position in each opening and having a concaved surface, and an active material in said pocket or receptacle, substantially as set forth.

10. A battery-electrode, comprising a plate having an opening therein, a pocket or receptacle secured in said opening and of less thickness along its longitudinal center than at the sides, and an active material in said pocket or receptacle, substantially as set forth.

11. A battery-electrode, comprising a plate having an opening therein and a pocket or receptacle containing a briquet of active material and secured in said opening, the pocket or receptacle being formed of two cup-shaped parts received one within the other, one of the parts having turned-over edges to lock the briquet therein, and being in turn locked within the other part by turned-over edges, as and for the purposes set forth.

12. A battery-electrode, comprising a plate having an opening therein and a pocket or receptacle containing a briquet of active material and secured in said opening, the pocket or receptacle being formed of two cup-shaped parts received one within the other, one of the parts having turned-over edges to lock the briquet therein and being in turn locked within the other part by turned-over edges, and the exposed surfaces of the pocket or receptacle being concaved, as and for the purposes set forth.

This specification signed and witnessed this 13th day of November, 1902.

THOS. A. EDISON.

Witnesses:
 FRANK L. DYER,
 J. F. RANDOLPH.